Aug. 29, 1944.  W. E. MYDANS  2,357,055

SPEED CONTROL AND SYNCHRONIZING DEVICE

Filed Aug. 18, 1941

Inventor
William E. Mydans
Elmer J. Gorn
Atty.

Patented Aug. 29, 1944

2,357,055

UNITED STATES PATENT OFFICE 2,357,055

SPEED CONTROL AND SYNCHRONIZING DEVICE

William E. Mydans, Cambridge, Mass.

Application August 18, 1941, Serial No. 407,341

2 Claims. (Cl. 175—355)

This invention relates to speed control and synchronizing devices and more particularly to such devices in which two or more rotating or moving bodies may have their speeds synchronized either with each other or with an independent and controllable frequency device.

Synchronization of rotary elements has application to a wide variety of systems in which two or more speeds are to be compared and controlled in accordance with deviations between them. One of the important applications of such synchronization is in connection with airplane motors.

In multi-motor airplanes it is important that close synchronization of the rotational speeds of the several engines be achieved in order to secure uniform propulsion. Such synchronization also eliminates interfering vibrations which may set up "beats" which may mechanically overstress structural parts of the plane and lead to the failure of such parts.

An object of this invention is to devise an arrangement whereby the several engine or motor speeds of a multi-motor plane may be synchronized within close limits to the speed of one motor selected as a "master-motor" or in which all motors may be synchronized to a fixed and controllable independent frequency generated by any suitable mechanical or electrical means.

Another object of this invention is to achieve synchronization of two or more independent velocities or frequencies of movement by matching them with a frequency of movement, the magnitude of which may be fixed or controlled, such matching means being actuated through light beams and a stroboscope device so arranged that one or the other of two photoelectric cells, but not both, are actuated according to whether the velocity of the body being controlled needs to be accelerated or decelerated.

A further object of this invention is to devise arrangements of the foregoing types which are simple, reliable and flexible in their operation.

The foregoing and other objects of this invention will be best understood from the following description of an exemplification thereof, reference being had to the accompanying drawing wherein.

Figure 1:
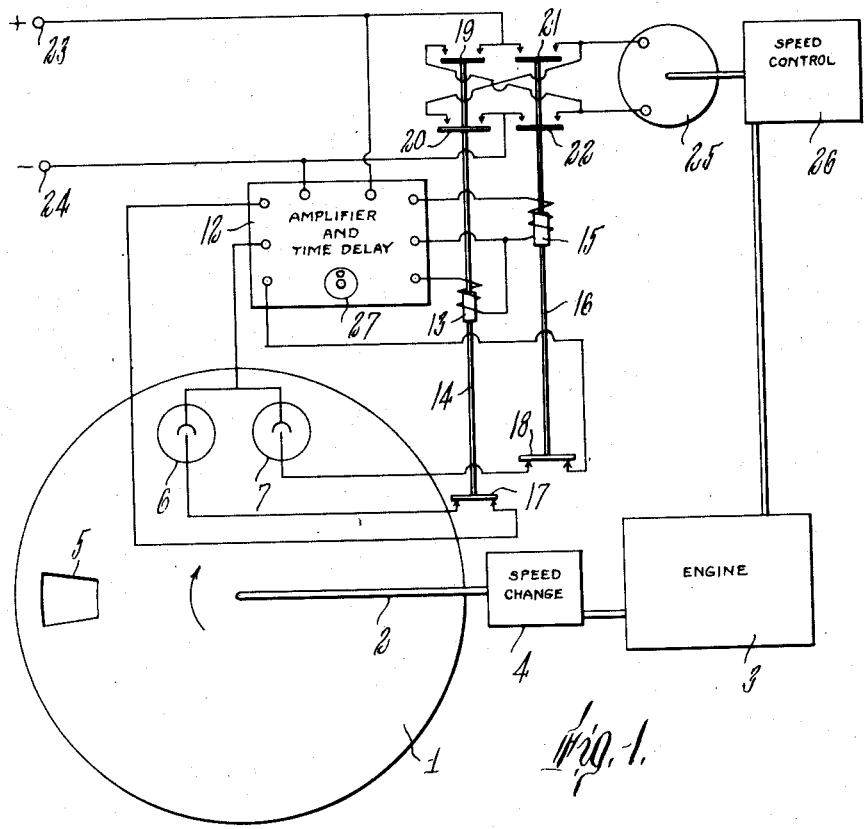
Fig. 1 is a diagrammatic representation of a system incorporating my invention.
Figure 2:
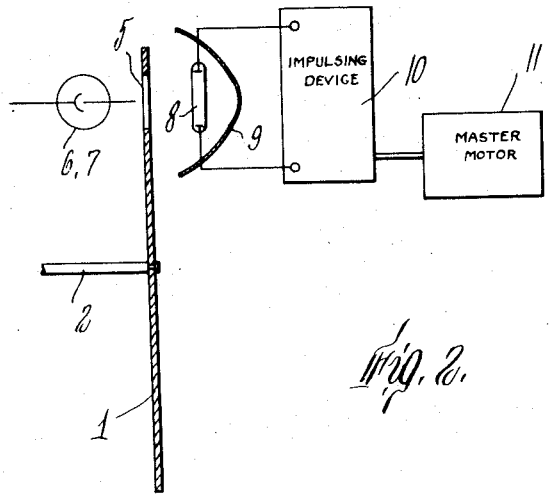
Fig. 2 is a diagrammatic side view of a portion of the arrangement shown in Fig. 1.

In the system illustrated, a disc 1 is driven by means of a shaft 2 from a rotating member such as an airplane engine 3. The shaft 2 may be driven directly or through a speed change device 4. If the device 4 is a step-up arrangement, the sensitivity of the system is increased. The disc 1 has one or more slots or apertures 5 therein. On one side of the disc are two photoelectric tubes 6, 7. These photoelectric tubes are located in a position so that the slot 5 travels by them during each rotation of disc 1.

On the opposite side of the disc 1, from the photoelectric tubes 6, 7, is located a lamp 8, or other suitable source of light which is interrupted at a regular and controllable frequency. The lamp 8 may be a gas filled tube supplied with electrical impulses from a suitable impulsing device 10. Each of such impulses is sufficient to cause the lamp 8 to emit a strong flash of light throughout the duration of each of said impulses. Other types of interrupted light sources might be used, such as an incandescent lamp or arc, from which the light is interrupted by passage through a slot or slots in a disc rotating at a controllable speed between the light and the rotating disc 1. It is desirable that the characteristics of the interrupted light source be such that the transition from light to dark be relatively sharp. Gas lamps such as 8 can be constructed with substantially no time lag so that the flashes of light emitted therefrom may have the desired sharp characteristic.

These flashes of light may be directed toward the photoelectric tubes 6, 7 by means of a reflector 9. The impulsing device 10 may be adjusted to determine accurately the number of flashes per unit time emitted from the lamp 8. For example, said impulsing device 10 might be an independent oscillator or a generator driven from a master motor 11 with which the engine 3 is to be synchronized. The motor 11 might be one of the engines of the airplane or a pilot motor controlling the speeds of all the airplane engines.

The photo tubes 6 and 7 are connected to a suitable amplifier and time delay device 12. Thus, when either one of said photo tubes is illuminated, the electrical impulse created is fed to the device 12 and amplified. This amplified impulse causes the device 12 to deliver at its output terminals a pulse of current which persists for a definite and pre-determined length of time, depending upon whether the photo tube 7 or 6 is illuminated. Such a pulse of current will be delivered either to the energizing coil 13 of a relay 14 or to the energizing coil 15 of a relay 16. The period of duration of such energizing impulse may be accurately fixed at any suitable magnitude, e. g. from 0.01 to 1.0 seconds. In effect, the time delay device 12 is such that when actuated by an impulse from one or the other of the photo tubes, it immediately closes the circuit to the coil 13 or coil 15 and that circuit remains closed for a fixed and preferably adjustable interval of time. An adjustable member 27 may be provided on the device 12 in order to select any desired time interval.

After the expiration of said time interval the coils 13 and 15 are de-energized and the device 12 becomes inoperative until the next photoelectric impulse again actuates one of the relays 14 or 16.

The time delay section of the device 12 may be of any well known type, such as magnetic build-up-decay devices, circuits for charging and discharging condensers through fixed or variable resistors, or other well known time delay circuits. As already indicated, such devices may be readily adjusted to give a time interval at any desired value within the operating limits of the device. By varying the magnitude of this time interval, a ready means is available for altering the sensitivity of the entire system.

The relays 14 and 16 are provided with back contact members 17 and 18 respectively interposed in the circuit of the photo-cell corresponding to the opposite relay. In other words, when photo tube 6 energizes relay 16, the back contact 18 de-energizes the photo tube 7 for the predetermined time interval mentioned above. The relay 14 is provided with a pair of contact members 19 and 20; while the relay 16 is provided with a similar pair of contact members 21 and 22. When the relay 14 is energized, its contact members 19 and 20 complete a circuit from terminals 23 and 24 to an auxiliary motor 25 which operates upon a speed control device 26. The motor 25 may be either of the rotating, solenoid or other suitable type, while the speed control device 26 may be a propeller pitch-changing means, an engine throttle or other means for altering the engine speed so as to bring it into synchronism with the frequency of flashing of the lamp 8.

The terminals 23 and 24 are adapted to be energized from a suitable source of direct current so that when the relay 14 closes the circuit, the motor 25 operates in a predetermined direction. This operation continues throughout the time the relay 14 is closed and throughout said period the speed control device acts upon the engine 3 so as to change its speed in accordance with the requirements of the system. Likewise the relay 16, by its contact members 21 and 22, reverses the connection between the terminals 23 and 24 and the motor 25 so that upon energization of said relay 16 the motor 25 operates in the reverse direction throughout the pre-determined time interval and causes the speed device control 26 to operate on the engine 3 so as to change its speed in the opposite sense.

If the number of flashes per minute from the lamp 8 is equal to the R. P. M. of the disc 1, the orientation of the aperture 5 each time a flash of light is emitted from the lamp 8 will remain fixed with respect to the photo tubes 6, 7. The operation of the system is such that under the synchronized conditions, the lamp 8 will flash either before or after the slot 5 has passed the photo tubes 6, 7.

Assuming that the disc 1 is driven in a clockwise direction, and the speed of the disc in R. P. M. exceeds the frequency per minute of the light flashes by one R. P. M., then the position of the slot 5 with respect to the photo cells when the light 8 flashes will progress in a clock-wise direction one complete revolution in one minute. Conversely, if the R. P. M. of the disc 1 is less than the number of flashes of light per minute, then the position of the slot 5 with respect to the photo tubes when the light 8 flashes will regress in a counter-clockwise direction.

If the engine 3 is running too fast, a condition will occur in which the slot 5 will uncover the tube 6 exactly at a time when the lamp 8 emits a flash of light. Thus the tube 6 will be illuminated, causing the relay 16 to be energized for a pre-determined interval of time, as described above. During this interval, the motor 25 causes the speed control device 26 to slow down the engine 3, thus tending to bring said engine speed into synchronism with the rate of flashing of the lamp 8.

Normally, the interval required to change the speed of the engine 3 appreciably is large with respect to the time of a single rotation of the disc 1. Therefore, during the period in which the speed of the engine 3 is being lowered, the lighted position of the aperture 5 will still be progressing in a clockwise direction so as to subsequently uncover the tube 7. However, since the relay 16 deenergizes the circuit of the tube 7 throughout this interval of time, the fact that the aperture 5 permits a flash of light to fall upon the tube 7 will not actuate the relay 14. Therefore, the system is permitted to operate in the desired direction for the requisite period of time to produce a substantial change in the engine speed without an inadvertent operation of the opposite relay.

If the control exercised by one actuation of the relay 16 is insufficient to produce synchronism, the aperture 5 will again progress so as to permit a flash of light to fall upon the tube 6. This will produce an additional slowing down of the engine 3 until proper synchronism is obtained.

If, however, the engine 3 is running too slowly, the lighted position of the aperture 5 will regress in a counterclockwise direction and thus a flash of light will fall upon the tube 7 before any light is permitted to fall upon the tube 6. Under these conditions the relay 14 will be energized producing a reverse operation of the motor 25 tending to increase the speed of the engine 3 during the pre-determined period of time. Also, the tube 6 will be deenergized for the purpose described above in connection with the de-energization of the tube 7. Such operation is repeated until the speed of the engine 3 is increased sufficiently to attain synchronism.

A simple case is that in which it is desired to control closely the operating speed of a single engine at e. g. 3600 R. P. M. The lamp 8 is set to flash 3600 times per minute. The disc 1 is driven by the engine 3 at a one to one speed ratio. The engine may be brought approximately to 3600 R. P. M. by any suitable means, such as a tachometer and the control device is then turned on. If the lack of synchronism is great, the frequency of corrective impulses supplied to one or the other of the control relays will be so great as to be virtually continuous until a close approach to synchronism is reached. Thereupon the operation of the system will continue as described above until exact synchronism is secured.

If, for example, two or more engines are to be synchronized, this may be accomplished according to this invention in various ways. For example, each engine may be provided with the control system as illustrated in Fig. 1. However, all of the flashing lamps 8 should be actuated at an identical frequency as by being supplied from the same impulsing device 10. If desired, all of the discs 1 together with their control systems may be located before a single flashing lamp. Under these conditions all of the engines will be brought into synchronism with the frequency of the flashing light and thus into exact synchronism with each other.

Of course, this invention is not limited to the particular details described above, as many equivalents will suggest themselves to those skilled in the art. For example, the tubes 6 and 7 may be of the photo-cell barrier type or other suitable light responsive type. Also, in addition to the adjustments for altering the sensitivity of the system described above, additional means for such purpose may be utilized. For example, the size of the aperture 5 may be varied. Also, a plurality of such apertures may be provided thereby increasing the number of light impulses transmitted through the disc 1 during each unit of time. Likewise, the lamp 8 might be made to flash at frequencies higher or lower, but at a fixed whole integer-ratio with respect to the reference speed to which it is desired to synchronize the speed of engine 3. Other variations and adaptations utilizing the present invention will readily suggest themselves. It is accordingly desired that the appended claims be given a broad interpretation commensurate with the scope of the invention within the art.

What is claimed is:

1. In a stroboscopic speed synchronizing apparatus, speed determining means comprising a pulsating light source having means for causing said light pulsations to occur at a predetermined substantially uniform recurrent reference speed determining frequencies, a pair of light responsive speed control devices arranged to receive light from the light source, and located in adjacent relation, a rotating member to be synchronized, a rotary shutter member driven by said rotating member in a fixed speed ratio thereto, positioned to intercept the passage of light between said light source and both of said light responsive speed control devices, said shutter having a light passing opening therein movable with the shutter member to progressively expose the light source to each of said light responsive speed control devices during a portion of each rotation of the shutter member, speed accelerating and decelerating means for controlling the speed of said member to be synchronized and an operating connection between said speed accelerating and decelerating means and each of said light responsive speed control devices for causing acceleration of said member to be synchronized upon light activation of one of the light responsive devices, and deceleration of said member to be synchronized upon light activation of the other light responsive speed control device whereby the rotation of said shutter member, with relation to said pulsating light source causes a stroboscopic light beam to progressively move in either direction toward one or the other of the light responsive devices to activate the same, depending upon the relative rotative velocity of the shutter and the pulsation frequency of the light from the light source.

2. In a stroboscopic speed synchronizing apparatus, for regulating the speed of a member to be controlled, a rotary shutter driven by said member to be controlled at a fixed speed ratio thereto, said shutter having a light-passing aperture therein radially spaced from the axis of rotation of the shutter, a pair of light-sensitive speed-control devices fixed in side-by-side relation adjacent one side of the shutter at substantially equally spaced distances from the shutter, and at a radial distance from the axis of the shutter equal to the distance between the rotary axis of the shutter and the center of the aperture in the shutter, speed accelerating and decelerating means for controlling the speed of the member to be synchronized, and an operating connection between each of said light-responsive speed-control devices and said speed accelerating and decelerating means for causing acceleration of said member to be controlled upon activation of one of the light-responsive devices, and deceleration of said member to be controlled upon light activation of the other light-responsive speed-control device, a pulsationg light source located adjacent the shutter, equidistant from the two light-sensitive speed-control devices and at a radial distance from the rotary axis of the shutter substantially equal to the distance between the latter axis and the center of the shutter aperture, said pulsating light source having means for causing said light pulsations to occur at predetermined substantially uniform recurrent reference speed determining frequencies whereby the rotation of the shutter member, with relation to the pulsating light source causes a stroboscopic light beam to progressively move in either direction toward one or the other of the light-responsive devices to activate the same, depending upon the relative rotative velocity of the shutter and the pulsation frequency of the light from the light source.

WILLIAM E. MYDANS.